United States Patent [19]
Choi et al.

[11] Patent Number: 5,511,602
[45] Date of Patent: Apr. 30, 1996

[54] COLLAPSIBLE MINI-BLIND SUN VISOR FOR VARIOUS VEHICLES

[76] Inventors: Sang D. Choi; Lee D. Choi, both of 2211 E. 16th, Los Angeles, Calif. 90021

[21] Appl. No.: 454,419

[22] Filed: May 30, 1995

[51] Int. Cl.$^6$ ........................................................ B60J 3/02
[52] U.S. Cl. .............................. 160/370.21; 160/DIG. 3; 160/166.1
[58] Field of Search ................ 160/370.21, 370.23, 160/DIG. 2, DIG. 3, DIG. 13, 900, 130, 166.1 R; 296/97.1, 97.7, 97.8, 97.9

[56] References Cited

U.S. PATENT DOCUMENTS

| | | | |
|---|---|---|---|
| D. 325,719 | 4/1992 | Langlais . | |
| 2,722,979 | 11/1955 | Janowitz | 160/130 X |
| 4,861,090 | 8/1989 | Gavrieli | 160/370.21 X |
| 4,929,014 | 5/1990 | Clark et al. | 160/370.21 X |
| 4,932,710 | 6/1990 | Chen | 160/370.21 X |
| 4,951,728 | 8/1990 | Takano | 160/166.1 R |
| 5,042,550 | 8/1991 | Yee | 160/370.23 X |
| 5,121,784 | 6/1992 | Lennard | 160/370.21 X |
| 5,152,573 | 10/1992 | Riera . | |
| 5,165,748 | 11/1992 | O'Connor . | |
| 5,265,929 | 11/1993 | Pelham . | |

*Primary Examiner*—David M. Purol
*Attorney, Agent, or Firm*—Eugene Oak

[57] ABSTRACT

A collapsible sun visor for use in a motor vehicle resembling a vertical mini-blind providing protection against sunlight. The sun visor is easily detachable and mountable by suction cups. The sun visor folds easily for convenient storage. A plurality of short parallelogram shaped panels with incisions at the ends of them are joined together with two rectangular horizontal strips at these incisions. The upper rectangular horizontal strip has suction cups attached to it to allow the sun visor to adhere to a windshield or a closed passenger window. The same upper horizontal strip also has four notches, two on each side, both at the ends of the strip, to provide a place where clips can be fastened to the upper horizontal strip which is in turn fastened to the sun visor to allow it to be hung on an open window. There are several possible variations to the mini-blind sun visor, as additional intermediate horizontal strips and longer vertical panels can be used to accommodate larger vehicles.

2 Claims, 8 Drawing Sheets

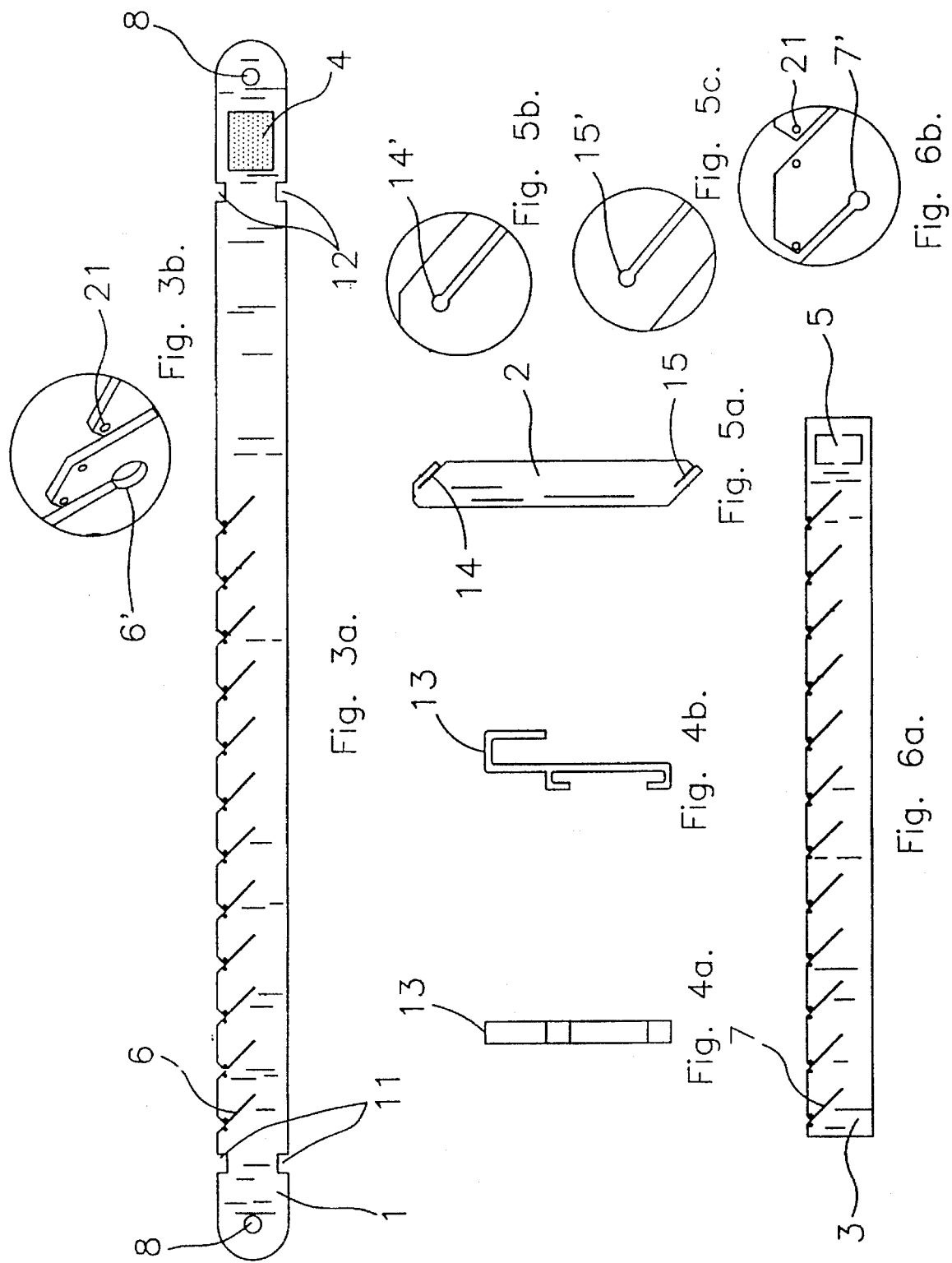

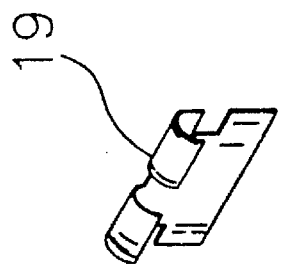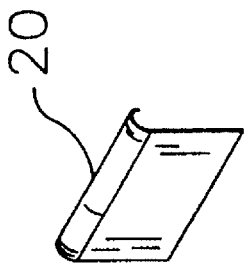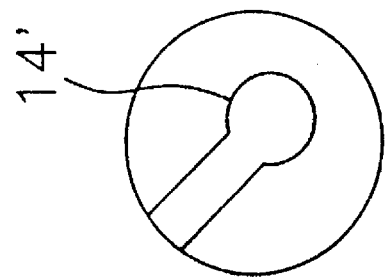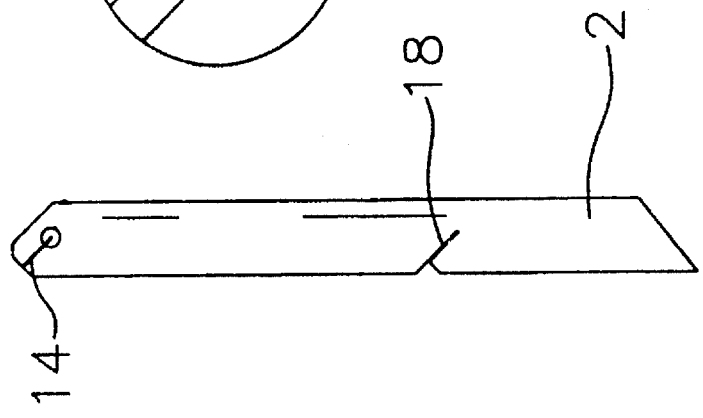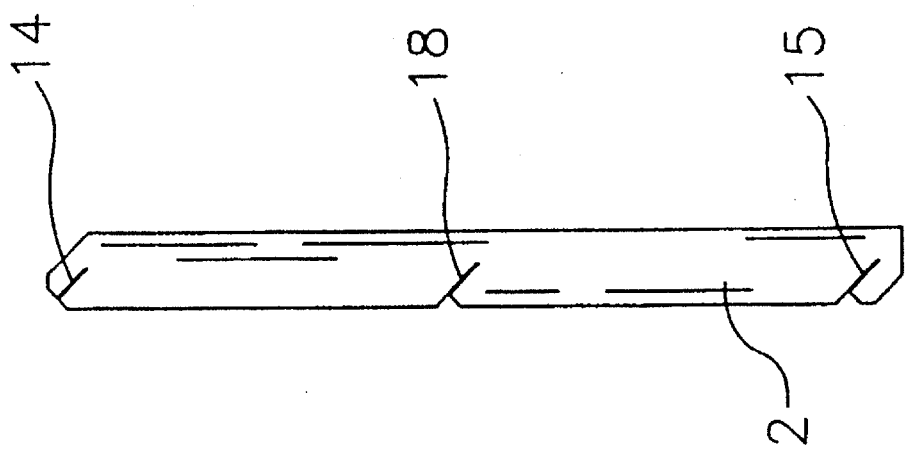

1
COLLAPSIBLE MINI-BLIND SUN VISOR FOR VARIOUS VEHICLES

BACKGROUND OF THE INVENTION

1. Field of the Invention

This invention relates generally to a sun visor intended for various vehicles and particularly to a sun visor having novel characteristics in its construction which provides protection against the sun.

2. Description of the Prior Art

It is a commonly known fact that vehicle sun visors are positioned to help prevent the bright sun rays from distracting the driver's and passengers' eyes during the course of driving. Without the sun visor, vision may be impaired and traffic accidents may result. The variety of sun visors that are available are typically opaque, rectangular, flat in nature and are fastened to an arm in front of the driver and front seat passenger.

The prior art discloses various sun visors. U.S. Pat. No. 5,152,573 issued to Riera discloses a sun visor that is extendable vertically to provide additional protection against the sun rays. Also, U.S. Pat. No. 5,165,748 issued to O'Connor discloses an extended vehicle visor that contains central and side panels which are capable of being folded into an inoperative position. In addition, U.S. Pat. No. 5,265,929 issued to Pelham discloses a disc-type sun blocker which is attached to a vehicle's sun visor for blocking the sun. Lastly, U.S. Patent No. Des. 325,719 to Langlais discloses an ornamental design for an extendable vehicle sun visor.

Although these prior arts disclose various sun visors, none of them disclose a mini-blind sun visor of the particular structure and novelty as disclosed and claimed hereinafter.

Accordingly, the principal object of the present invention is to provide a sun visor that is effective in preventing sun rays from penetrating the driver's and passengers' eyes.

It is another object of the present invention to provide a sun visor that is easily mounted.

It is another object of the present invention to provide a sun visor that can be mounted on the passenger windows of a vehicle to protect the passengers from sunlight, especially children.

It is yet another object of the present invention to provide a sun visor that is easily collapsible.

It is a further object of the present invention to provide a sun visor that is economical to manufacture.

SUMMARY OF THE INVENTION

The present invention is a sun visor that resembles a vertical mini-blind. The sun visor consists of vertical panels made of a pliable material, including but not limited to plastic. The extended visor folds into place adjacent to a conventional vehicle sun visor. In an inoperative position, all the panels fold upon each other to close the extended visor for convenient storage. The panels are positioned in a slanted manner allowing the sun's radiation to shine at an angle, thus deflecting it from directly radiating into the driver's eyes. The vertical panels have horizontal strips above and below the panels to keep the sun visor in its extended position.

When the sun visor is not in its extended position, a fastener such as Velcro™ can be used to keep it in a retracted position. The sun visor is attached to the front windshield by a fastening means such as a suction cup at each end. In addition, the sun visor may be constructed in many sizes and materials. This visor can be attached on any interior surface of the vehicle. When attached to the side windows, the invention is best secured by the use of two clips which may simply be hung over the open window. The sun visor may be used in conventional automobiles, trucks, buses, airplanes, boats, and other vehicles.

The sun visor may be extended by increasing the length of the vertical panels and horizontal strips to accommodate for larger motor vehicles. The larger sun visor retracts and expands in the same way the previously explained sun visor does.

These together with other objects of the invention are pointed out clearly in the claims annexed to and forming a part of this disclosure. For a better understanding of the invention, its operating advantages and the specific objectives attained by its use, reference should be made to the accompanying drawings and descriptive matter in which there are illustrated preferred embodiments of the invention.

BRIEF DESCRIPTION OF THE DRAWINGS

For a better understanding of the principle and nature of the present invention, references should be made to the following detailed description taken in accordance with the accompanying drawings in which:

FIG. 3a is a frontal view of the upper horizontal strip of the invention;

FIG. 3b is an exploded view of an angular incision and the hole at the end of the angular incision along the upper horizontal strip;

FIG. 4a is a frontal view of a clip used to fasten the invention on an open window;

FIG. 4b is a side view of the clip depicted in FIG. 4a;

FIG. 5a is a frontal view of a vertical panel of the invention;

FIG. 5b is an exploded view of the upper incision and the hole at the end of the upper incision on the vertical panel depicted on FIG. 5a;

FIG. 5c is an exploded view of the lower incision and the hole at the end of the lower incision on the vertical panel depicted in FIG. 5a;

FIG. 6a is a frontal view of the lower horizontal strip of the invention;

FIG. 6b is an exploded view of the angular incision and the hole at the end of the angular incision along the lower horizontal strip depicted in FIG. 6a;

FIG. 8a is a frontal view of a vertical panel of the alternate embodiment previously depicted in FIG. 7.

FIG. 8b is a frontal view of another vertical panel of the alternate embodiment previously depicted in FIG. 7.

FIG. 8c is an exploded view of the upper incision and the hole at the end of the upper incision on a vertical panel of the alternate embodiment previously depicted in FIG. 7.

FIG. 9 is a perspective view of the male part of the fastening means of the alternate embodiment previously depicted in FIG. 7.

3

Figure 7:
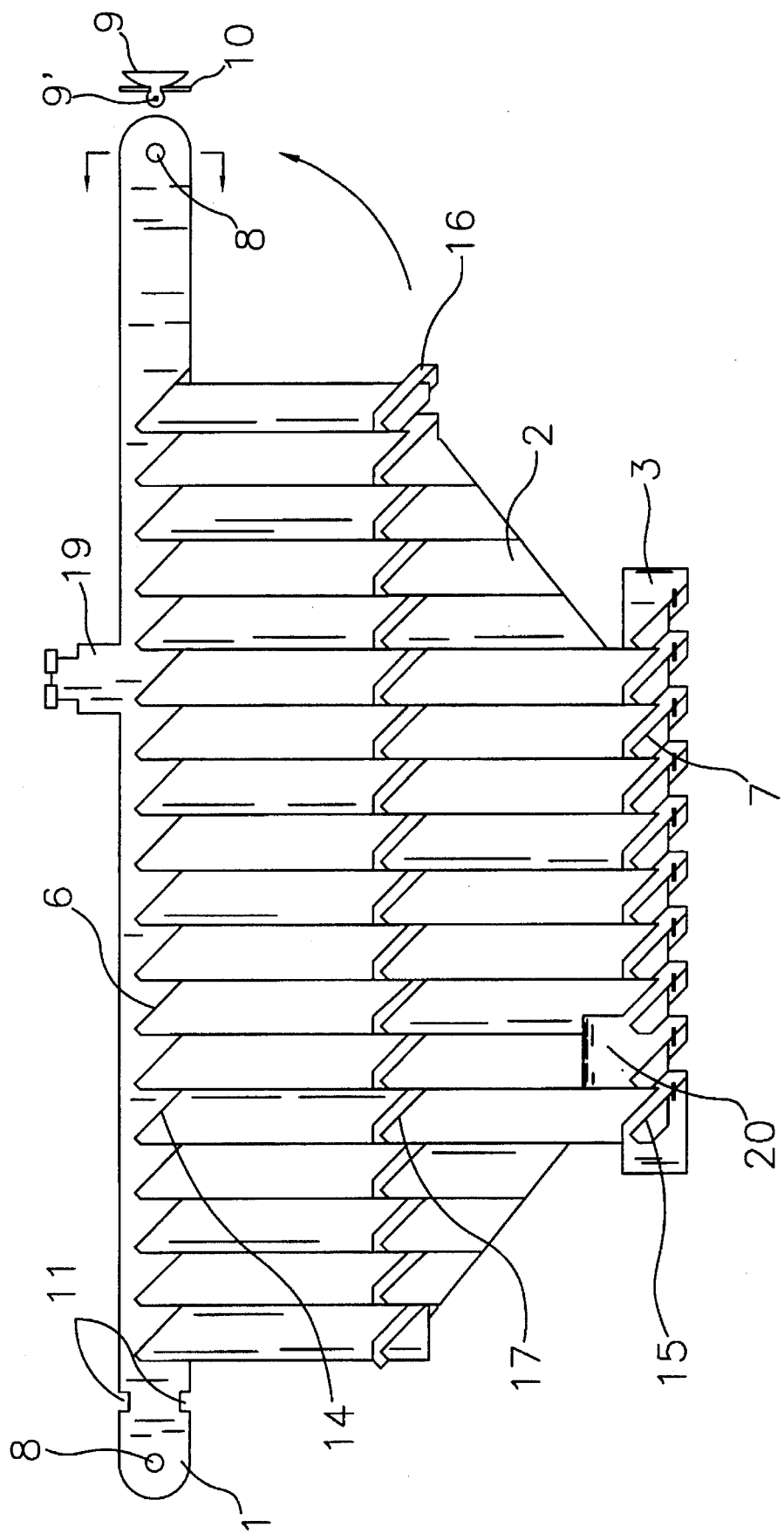
FIG. 7 is a frontal view of an alternate embodiment of the present invention extended for covering a larger area.

FIG. 10 is a perspective view of the female part of the fastening means of the alternate embodiment previously depicted in FIG. 7.

Figure 11:
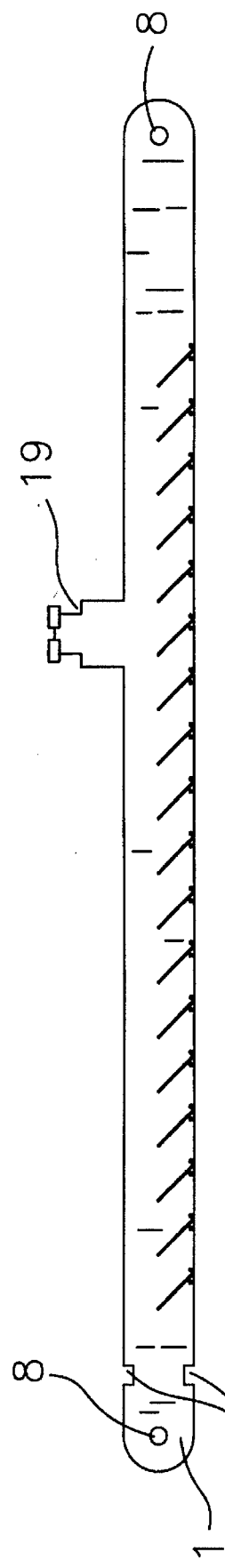

FIG. 11 is a frontal view of the upper horizontal strip of the alternate embodiment previously depicted in FIG. 7.

Figure 12:
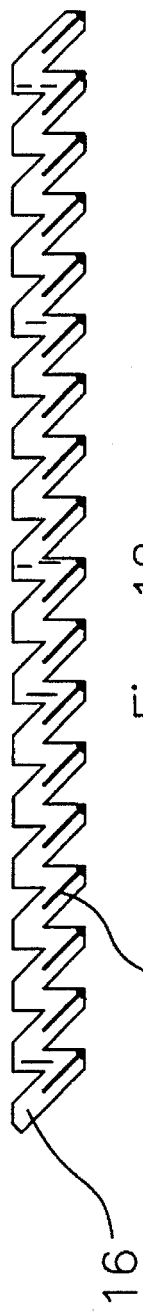

FIG. 12 is a frontal view of the intermediate horizontal strip alternate embodiment previously depicted in FIG. 7.

Figure 13:
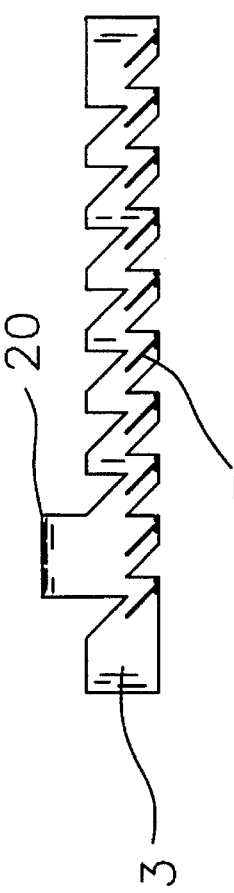

FIG. 13 is a frontal view of the lower horizontal strip of the alternate embodiment previously depicted in FIG. 7.

Figure 14C:
Figure 14B:
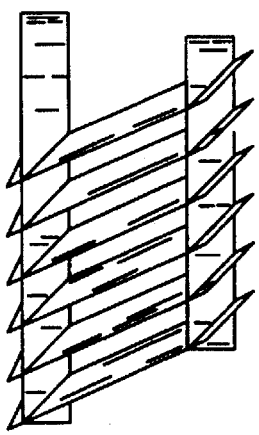

14a, FIG. 14b, and FIG. 14c are step by step frontal illustrations of the retraction of the invention.

Figure 15:
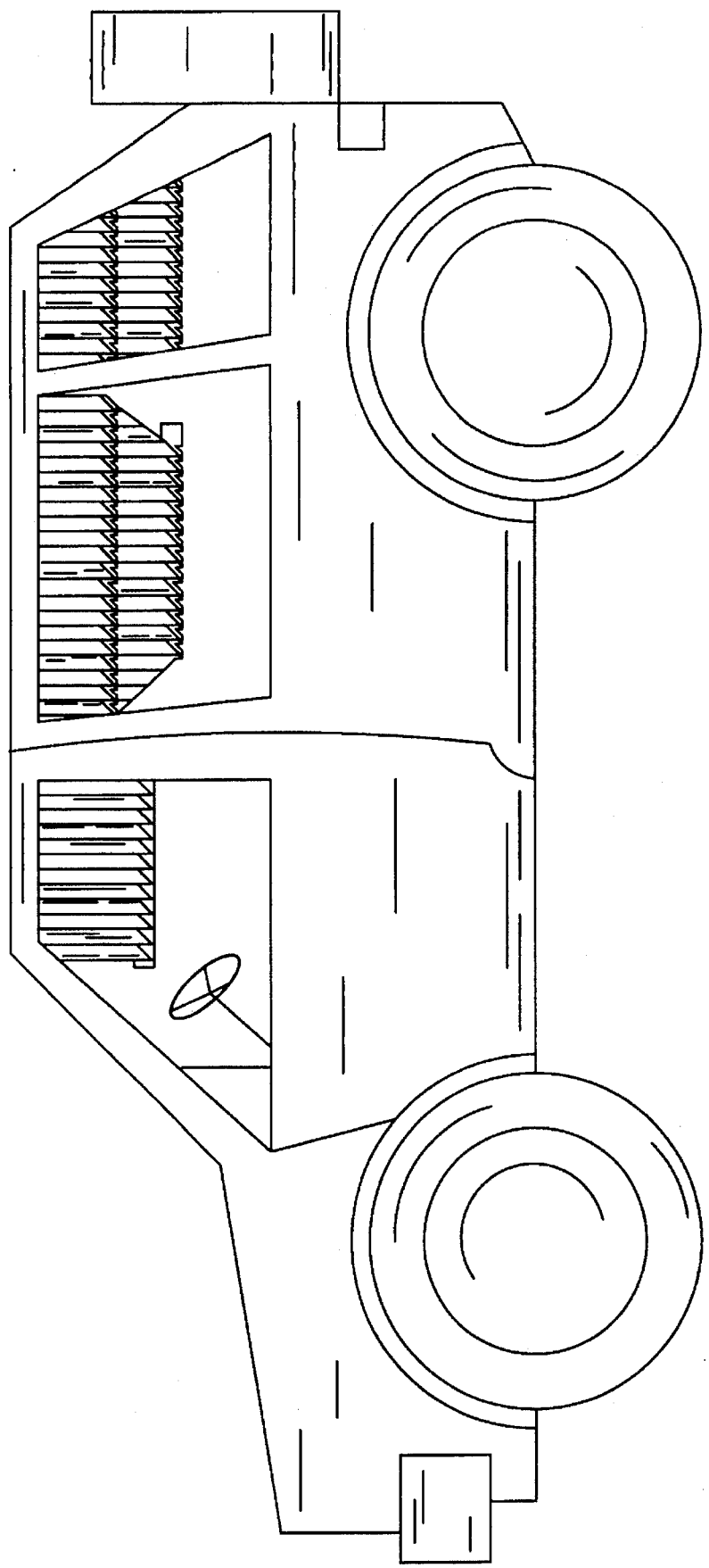

FIG. 15 is a diagram of the preferred placement of both the preferred embodiment and the alternate embodiment of the invention in an automobile.

DETAILED DESCRIPTION OF THE PREFERRED EMBODIMENT

Figure 1:
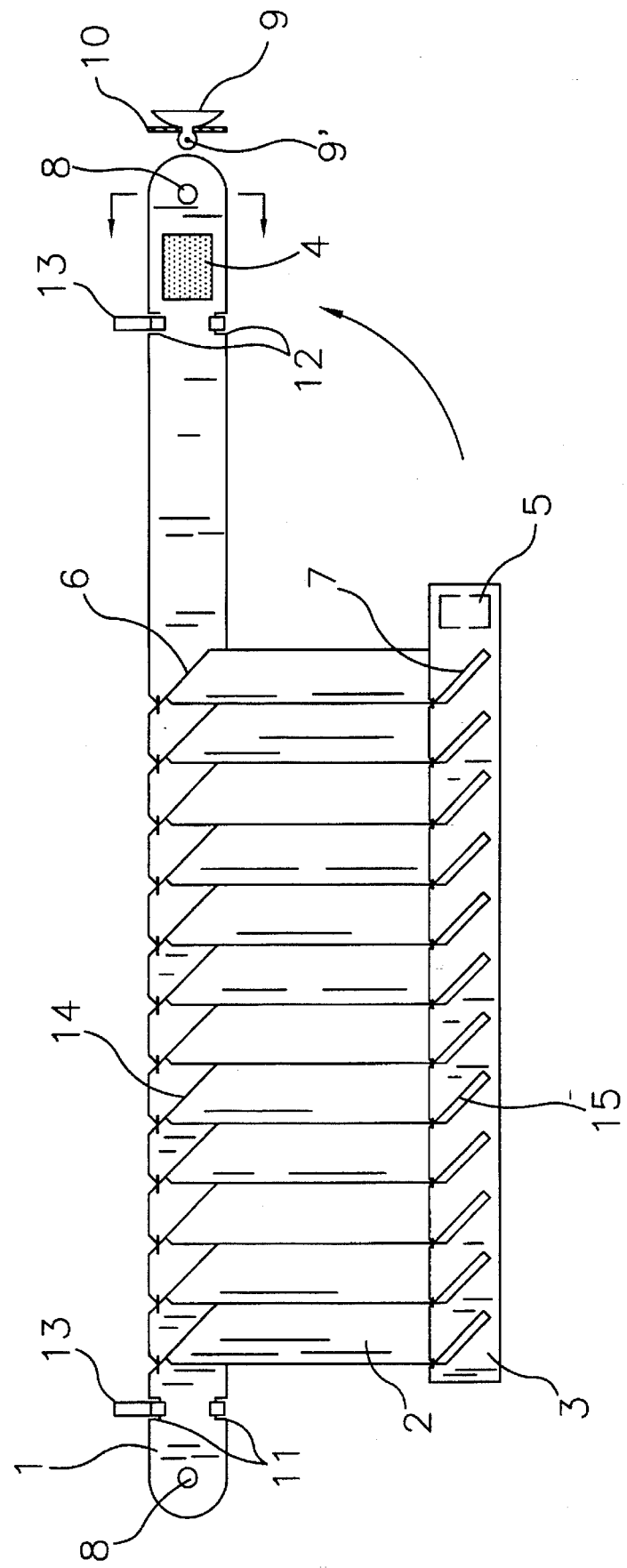
FIG. 1 is a frontal view of the invention in its extended position.
Figure 2:
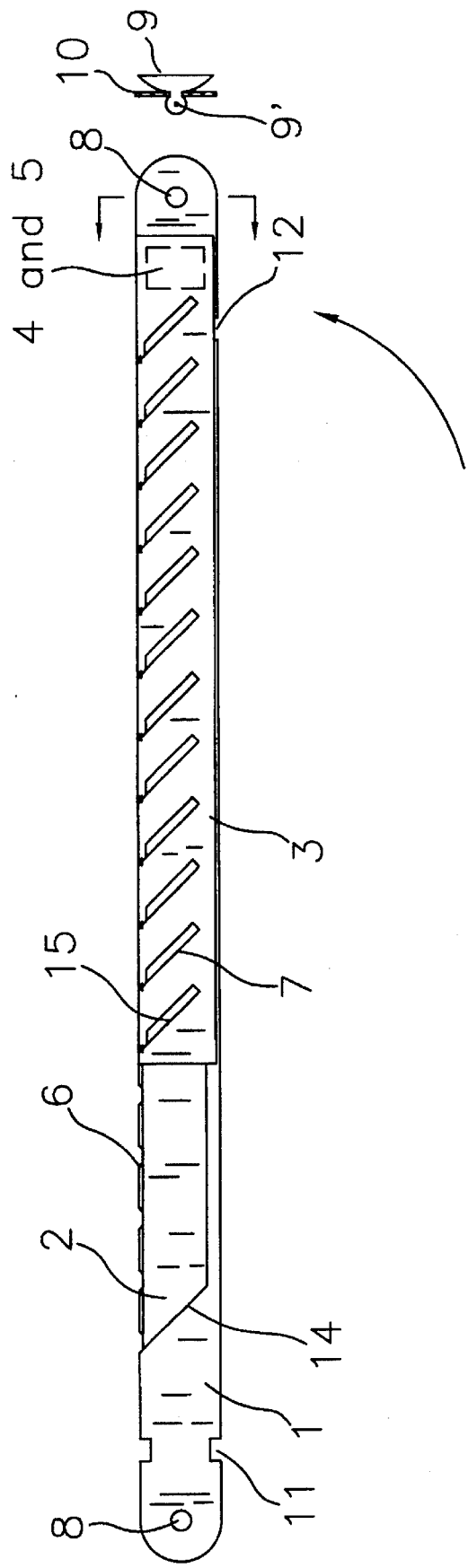
FIG. 2 is a frontal view of the invention in its retracted position.
Figure 14A:
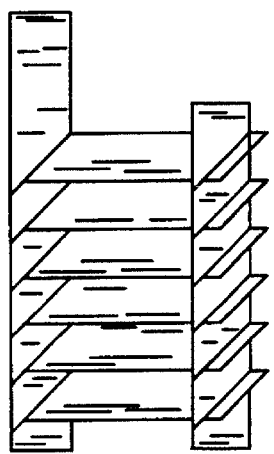

Referring to FIG. 1, the mini-blind sun visor is comprised of an upper horizontal strip 1 made of pliable material, including but not limited to plastic, and a plurality of vertical panels 2 made of the same material. One end of each vertical panel 2 is pivotally attached to the upper horizontal strip 1. The other end of each vertical panel 2 is pivotally attached to a lower horizontal strip 3. The vertical panels 2 shield the sunlight, whereas the primary purpose of the upper horizontal strip 1 and the lower horizontal strip 3 is to hold and support the vertical panels 2 and the sun visor in place. The vertical panels 2 are arranged in between the upper horizontal strip 1 and the lower horizontal strip 3 to allow the present invention to be collapsed for convenient storage as shown in FIG. 14a, FIG. 14b, and FIG. 14c. The completely collapsed invention is depicted in FIG. 2. Attached at one end of the upper horizontal strip 1 is a fastening means 4 such as Velcro™. Also attached at one end of the lower horizontal strip 3 is a corresponding fastening means 5 such as Velcro™. To secure the lower horizontal strip 3 to the upper horizontal strip 1 with the plurality of vertical panels 2 therebetween in the retracted position, the corresponding fastening means 5 of the lower horizontal strip 3 is pulled up and to the right until it is attached to the fastening means 4 of the upper horizontal strip 1.

Referring to FIG. 3a, located on the upper horizontal strip 1 are a plurality of angular incisions 6 equidistant from each other. These incisions are made along the upper long side of the upper horizontal strip 1. The incisions are made at a 45 degree angle and extend about halfway through the strip. Referring to FIG. 3b, at the ends of these incisions are very small holes 6' to reduce friction between the upper horizontal strip 1 and the vertical panels 2 when the sun visor is being compacted. At both ends of the upper horizontal strip 1 are small apertures 8 which are used to hold a mounting means or suction cups 9 that allow the present invention to adhere to a windshield. At both ends of the upper horizontal strip 1 are suction cups 9, shown in FIG. 1, that allow the present invention to adhere to the windshield or any other interior window of a vehicle. The suction cups 9 have dimples 9' on their rear sides; fastening a washer 10 on each dimple keeps the suction cups 9 in place. As an alternate method of fastening the sun visor to a side window, small notches 11 and 12 are on each side of the strip at each end to provide a place for the visor to be fastened to a clothes hanger rack or hung on an open window that most vehicles provide. The notches provide a place for clips 13 to be fastened on the upper horizontal strip 1 which is in turn fastened to the sun visor to keep it in place on a clothes hanger or an open window in a vehicle.

The lower horizontal strip 3 is similar to the upper horizontal strip 1. Referring to FIG. 6a, the lower horizontal strip has a plurality of angular incisions 7 that are distributed equidistantly and span the length of the lower horizontal strip. These incisions are along the upper long side of the strip. Referring to FIG. 6b, at the end of these incisions are very small holes 7' that reduce friction between the lower horizontal strip 3 and the vertical panels 2 when the sun visor is compacted. At the far right end of the lower horizontal strip 3 is a fastening means 5 which corresponds to the fastening means 4 on the upper horizontal strip 1. These fastening means allow the sun visor to stay in the collapsed position.

Referring to FIG. 5a, between the upper horizontal strip 1 and the lower horizontal strip 3 are several short vertical panels 2 that hold them together. Each vertical panel 2 does not have the form of a rectangle but of a parallelogram. Each vertical panel 2 has an upper incision 14 and a lower incision 15, one at each end of the vertical panel and on the same side of the vertical panel. Both the upper incision 14 and the lower incision 15 are at 45 degree angles (as are the ends of panels) and extend halfway into the vertical panel 2. The incisions are located near the ends of the vertical panel 2. Referring to FIG. 5b, at the end of the upper incision 14 is a hole 14' which allows the sun visor to be more easily folded into the extended position by reducing the friction created between the upper horizontal strip 1 and the vertical panel 2. Referring to FIG. 5c, at the end of the lower incision 15 is a hole 15' which allows the sun visor to be more easily folded into the extended position by reducing friction created between the lower horizontal strip 3 and the vertical panel The upper incision 14 on the vertical panel 2 is interlocked with the corresponding angular incision 6 on the upper horizontal strip 1. In the same manner, the lower incision 15 on the vertical panel 2 is interlocked with the corresponding angular incision 7 on the lower horizontal strip. Therefore they are interlocked into each other, each vertical panel 2 connecting with the upper horizontal strip 1 and the lower horizontal strip 3, one on each end of each vertical panel 2. As the angular incisions 6 along the upper horizontal strip 1 and the angular incisions 7 on the lower horizontal strip 3 are equidistant from each other, so are the vertical panels 2 from one another. Referring to FIG. 3b and FIG. 6b, to prevent the vertical panels 2 from sliding out of the connections with the upper horizontal strip 1 and lower horizontal strip 3, to the left and the right of each angular incision 6,7 of both strips are small punctures 21 that can accommodate a string or a staple. The string or staple is anchored at the small punctures and stretches across the incision, thereby keeping the vertical panel 2 in place. Because the vertical panels 2 are adjacently oriented along the upper horizontal strip 1 and lower horizontal strip 3, they allow for the deflection of sunlight.

Although the present invention has been described as being comprised only of an upper horizontal strip 1 and a lower horizontal strip 3, an alternate embodiment of the present invention has an intermediate horizontal strip 16 with a plurality of angular incisions 17 as depicted in FIG. 12. Referring to FIG. 7, this particular embodiment accommodates for larger vehicles. The sun visor is still collapsible as the upper horizontal strip 1 folds on top of the lower horizontal strip 3. The addition of the intermediate horizontal strip 16 accommodates for longer vertical panels 2. Referring to FIG. 8a and FIG. 8b, these vertical panels 2 have an intermediate incision 18 instead of just an upper incision 14 and lower incision 15. The upper incision 14, the lower incision 15, and the intermediate incision 18 on the vertical panels 2 slide into the corresponding incisions on the upper horizontal strip 1, intermediate horizontal strip 16, and lower horizontal strip 3. When folded into the collapsed position, the intermediate horizontal strip 16 folds beneath the upper horizontal strip 1, and the lower horizontal strip 3 folds beneath the intermediate horizontal strip 16. When in the folded position, this alternate embodiment has a fastening means as depicted in FIG. 9 and FIG. 10. A male connection 19 on the upper horizontal strip 1 and a female connection 20 on the lower horizontal strip 3 secure the sun visor when not in use.

What is claimed as being new and therefore desired to be protected by letter patent of the United States is as follows:

1. A collapsible mini-blind sun visor for various vehicles comprising:
   a. a plurality of vertical panels;
      (1) all of said vertical panels having equal dimensions;
      (2) each of said vertical panels having a general parallelogram shape;
      (3) each of said vertical panels having an upper side, a lower side, and a middle;
      (4) each of said vertical panels being made of a pliable material, including but not limited to plastic;
      (5) each of said vertical panels having an angular upper incision and an angular lower incision;
      (6) wherein said upper incision and said lower incision are at said upper and said lower side of said vertical panel, parallel to said upper side and said lower side of said panel;
      (7) wherein said upper and lower incision extend to said middle of said vertical panel;
      (8) wherein said upper incision and said lower incision extend to an end;
      (9) wherein said upper incision and said lower incision are wide enough to accommodate an upper horizontal strip and a lower horizontal strip of similar material and width; and
      (10) wherein a hole exists at said end of said upper incision and said lower incision to allow said sun visor to be more easily extended and collapsed;
   b. said vertical panels affixed to said upper horizontal strip;
      (1) said upper horizontal strip having four corners and two ends;
      (2) said upper horizontal strip having a rectangular shape, two sides being long, two sides being short, but said corners not necessarily being rectangular;
      (3) said upper horizontal strip having a middle;
      (4) said upper horizontal strip having a plurality of angular incisions along only one of said long sides;
      (5) wherein said incisions have an angle of 45 degrees with respect to said long side of said upper horizontal strip;
      (6) wherein said incisions extend to said middle of said upper horizontal strip;
      (7) wherein said incisions are wide enough to accommodate said vertical panels of similar material and width;
      (8) wherein said incisions have an end at said middle of said upper horizontal strip;
      (9) wherein there exists a very small hole at said end of said incisions;
      (10) said angular incisions having an upper left side and upper right side;
      (11) wherein said upper left side of said incision has a small puncture;
      (12) wherein said upper right side of said incision has a small puncture;
      (13) wherein said punctures can accommodate but are not limited to accommodating a staple intended to prevent said vertical panels from slipping out of said angular incisions;
      (14) said upper horizontal strip having two small apertures;
      (15) said two small apertures being located near said ends of said upper horizontal strip;
      (16) said two small apertures holding two suction cups;
      (17) said suction cups having a front and rear end;
      (18) said suction cups having a dimple on said rear end;
      (19) wherein said small apertures can accommodate said dimple of said suction cup for fastening purposes;
      (20) wherein said dimple is held in place by a washer;
      (21) said upper horizontal strip having a fastening material intended to correspond to a fastening material on a lower horizontal strip;
      (22) said upper horizontal strip having four notches, two on each of said long sides, near said ends of said upper horizontal strip;
      (23) wherein said notches are able to hold clips;
      (24) wherein said clips are intended to fasten said sun visor in place;
   c. said vertical panels affixed to said lower horizontal strip;
      (1) said lower horizontal strips having four sides, four corners, two ends, and a middle;
      (2) said lower horizontal strips having a rectangular shape, two of said sides being long, two of said sides being short, but said corners not necessarily being rectangular;
      (3) said lower horizontal strip having a plurality of angular incisions along one of said long sides;
      (4) wherein said incisions have an angle of 45 degrees with respect to said long side of said lower horizontal strip;
      (5) wherein said incisions extend to said middle of said lower horizontal strip;
      (6) wherein said incisions are wide enough to accommodate said vertical panel of similar material and width;
      (7) wherein said incisions have an end at said middle of said upper horizontal strip;
      (8) wherein there exists a very small hole at said end of said incisions;
      (9) said angular incisions having an upper left side and upper right side;
      (10) wherein said upper left side of said incision has a small puncture;
      (11) wherein said upper right side of said incision has a small puncture;
      (12) wherein said punctures can accommodate but are not limited to accommodating a staple intended to prevent said vertical panels from slipping out of said angular incisions;
      (13) said lower horizontal strip having said fastening material attached to said end and intended to correspond to said fastening material on said upper horizontal strip;
   d. said vertical panels being connected to said upper horizontal strip and said lower horizontal strip;
      (1) each of said vertical panels being connected to said upper horizontal strip by means of interlocking said incisions;

(2) said upper incision of said vertical panel being slided into said incision of said upper horizontal strip;
(3) each said vertical panel being connected to said upper horizontal strip by means of interlocking said incisions;
(4) said lower incision of said vertical panel being slided into said incision of said lower horizontal strip;
(5) each said vertical panel being able to fold to a perpendicular angle with said upper horizontal strip and lower horizontal strip with aid of said holes at said ends of said incisions, thus making said sun visor collapsible; and
(6) said incisions on said upper horizontal strip and said lower horizontal strip being closed to prevent said vertical panels from sliding out.

2. A collapsible mini-blind sun visor for various vehicles as set forth in claim 1, wherein there is a plurality of intermediate horizontal strips instead of just said upper horizontal strip and said lower horizontal strip, wherein said intermediate horizontal strips resemble said lower horizontal strip, and accommodate for longer said vertical panels.

\* \* \* \* \*